(12) United States Patent
Amador et al.

(10) Patent No.: US 10,626,646 B1
(45) Date of Patent: Apr. 21, 2020

(54) SELF-CONTAINED DOOR HINGE RELEASE

(71) Applicant: FORD GLOBAL TECHNOLOGIES, LLC, Dearborn, MI (US)

(72) Inventors: Lizardo Amador, Mexico City (MX); Aaron Anderson, Livonia, MI (US); Kyle Ebner, Pinckney, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/417,847

(22) Filed: May 21, 2019

(51) Int. Cl.
| | |
|---|---|
| *E05D 7/10* | (2006.01) |
| *E05D 11/00* | (2006.01) |
| *E05D 7/12* | (2006.01) |
| *H01R 35/04* | (2006.01) |
| *B60R 16/027* | (2006.01) |

(52) U.S. Cl.
CPC ........ *E05D 11/0081* (2013.01); *B60R 16/027* (2013.01); *E05D 7/121* (2013.01); *H01R 35/04* (2013.01); *E05Y 2400/654* (2013.01); *E05Y 2900/531* (2013.01)

(58) Field of Classification Search
CPC ....... H01R 35/04; E05D 7/105; E05D 7/1055; E05D 11/0081
USPC ...................................... 31/31, 349
See application file for complete search history.

(56) References Cited

U.S. PATENT DOCUMENTS

| | | | | |
|---|---|---|---|---|
| 3,070,389 | A * | 12/1962 | Baur ........................ | G03B 3/02 403/317 |
| 3,076,163 | A | 1/1963 | Nodge et al. | |
| 3,793,610 | A * | 2/1974 | Brishka .............. | H01R 13/6277 439/349 |
| 4,542,558 | A * | 9/1985 | Brockhaus .............. | E05D 5/128 16/263 |
| 4,854,009 | A * | 8/1989 | Brockhaus ................ | E05D 5/12 16/263 |
| 5,237,723 | A | 8/1993 | Little | |
| 5,772,355 | A * | 6/1998 | Ross ...................... | G02B 23/24 403/322.1 |
| 7,005,973 | B2 | 2/2006 | Haigh et al. | |

(Continued)

FOREIGN PATENT DOCUMENTS

| | | |
|---|---|---|
| CN | 101356333 | 1/2009 |
| DE | 102004012006 | 6/2005 |

(Continued)

*Primary Examiner* — Neil Abrams
(74) *Attorney, Agent, or Firm* — David Coppiellie; Price Heneveld LLP

(57) ABSTRACT

A door hinge assembly comprises a first hinge member mounted to a motor vehicle and a second hinge member mounted to the removable door assembly rotatable between a closed position and a nominal fully open position. A locking member retains the second hinge member relative the first hinge member when the removable door assembly is rotated between the closed position and the nominal fully open position. A release block and a release tab is alternatively provided on either of the first or second hinge member. The release tab is resiliently urged to a locked position when the removable door assembly is rotated between the closed position and the nominal fully open position. The release tab is displaced to an unlocked position by the release block when the removable door assembly is rotated to an extended open position, whereupon the first hinge member may be separated from the second hinge member.

20 Claims, 8 Drawing Sheets

(56) References Cited

U.S. PATENT DOCUMENTS

| | | | |
|---|---|---|---|
| 7,325,276 B2* | 2/2008 | Kim | E05D 5/128 16/262 |
| 7,921,514 B2* | 4/2011 | Anillo Crespo | E05D 5/12 16/266 |
| 7,963,001 B2 | 6/2011 | Yip | |
| 8,496,494 B2* | 7/2013 | Jordan | H01R 9/032 439/349 |
| 8,656,558 B2* | 2/2014 | Van Gennep | E05D 11/1007 16/229 |
| 8,753,129 B2* | 6/2014 | Worley | H01R 35/04 439/31 |
| 9,935,413 B1* | 4/2018 | Fowle | E05D 11/0081 |
| 2002/0112320 A1* | 8/2002 | Hayashi | B60R 16/0207 16/386 |
| 2005/0210630 A1 | 9/2005 | Lowen et al. | |
| 2008/0142256 A1 | 6/2008 | Puhl | |
| 2008/0295290 A1 | 12/2008 | Murray et al. | |

FOREIGN PATENT DOCUMENTS

| | | |
|---|---|---|
| EP | 0397610 | 11/1990 |
| EP | 0972126 | 1/2000 |
| EP | 1375803 | 1/2004 |
| EP | 1574650 | 9/2005 |
| WO | 9940281 | 8/1999 |

* cited by examiner

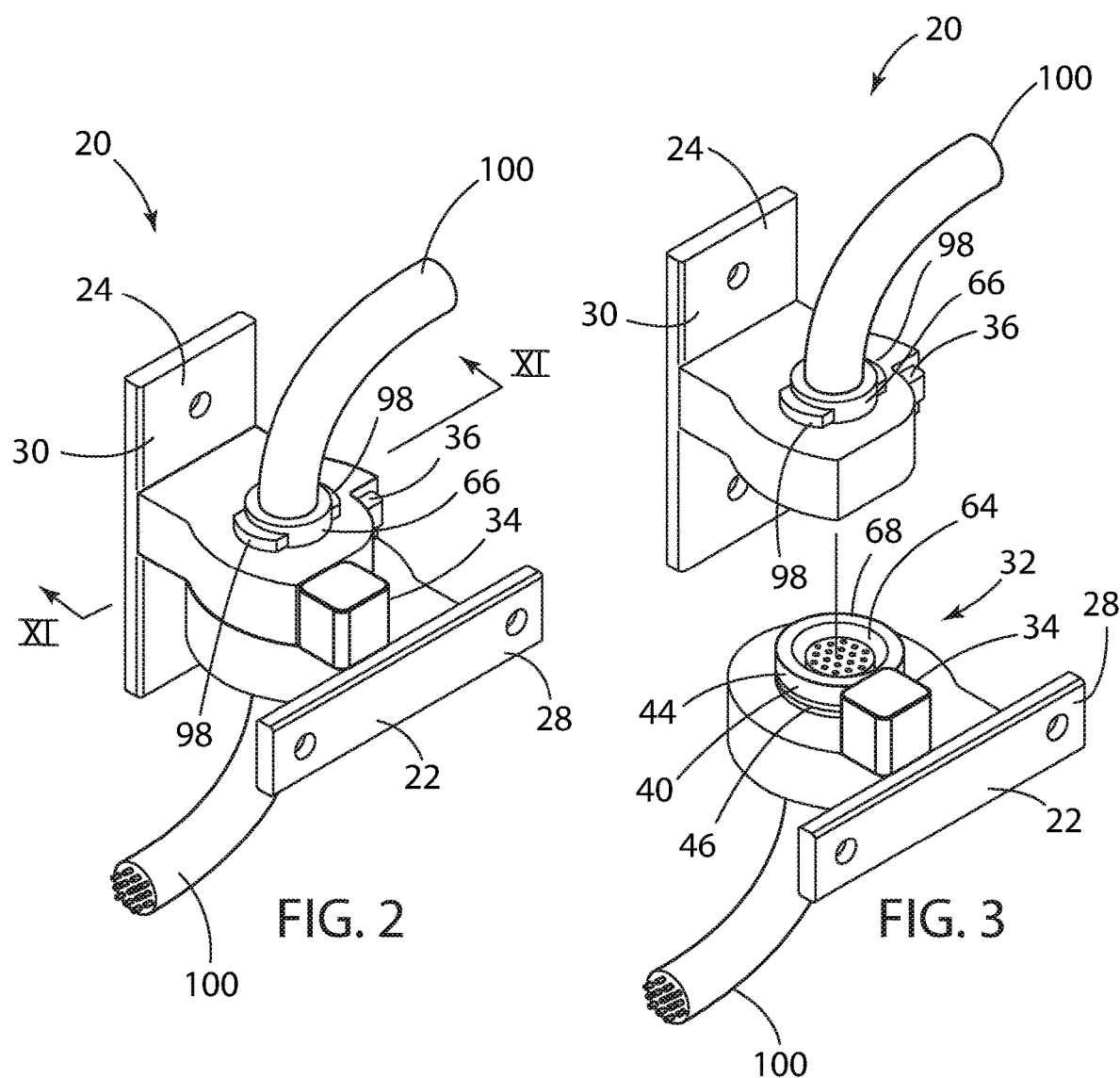

FRONT

FRONT

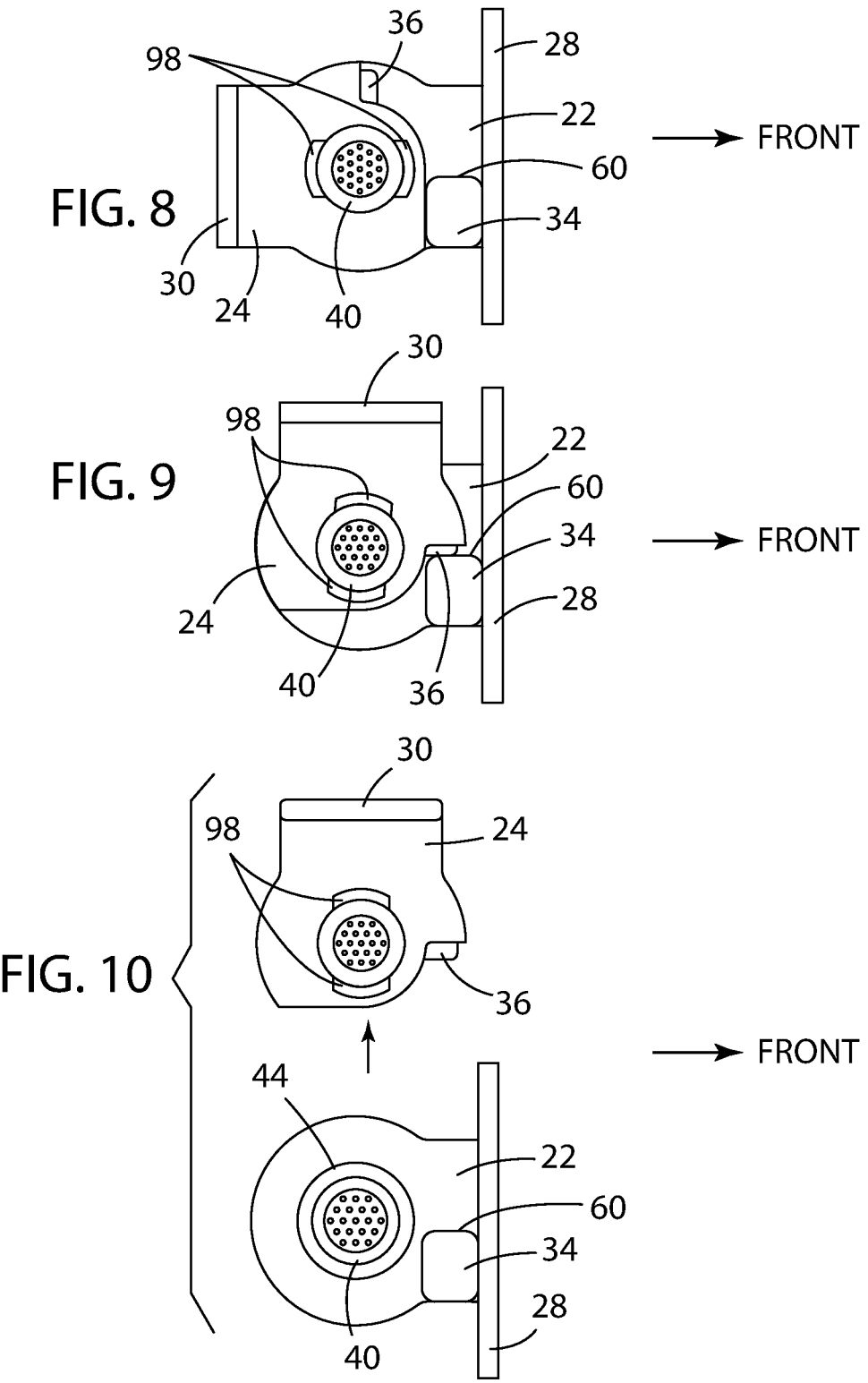

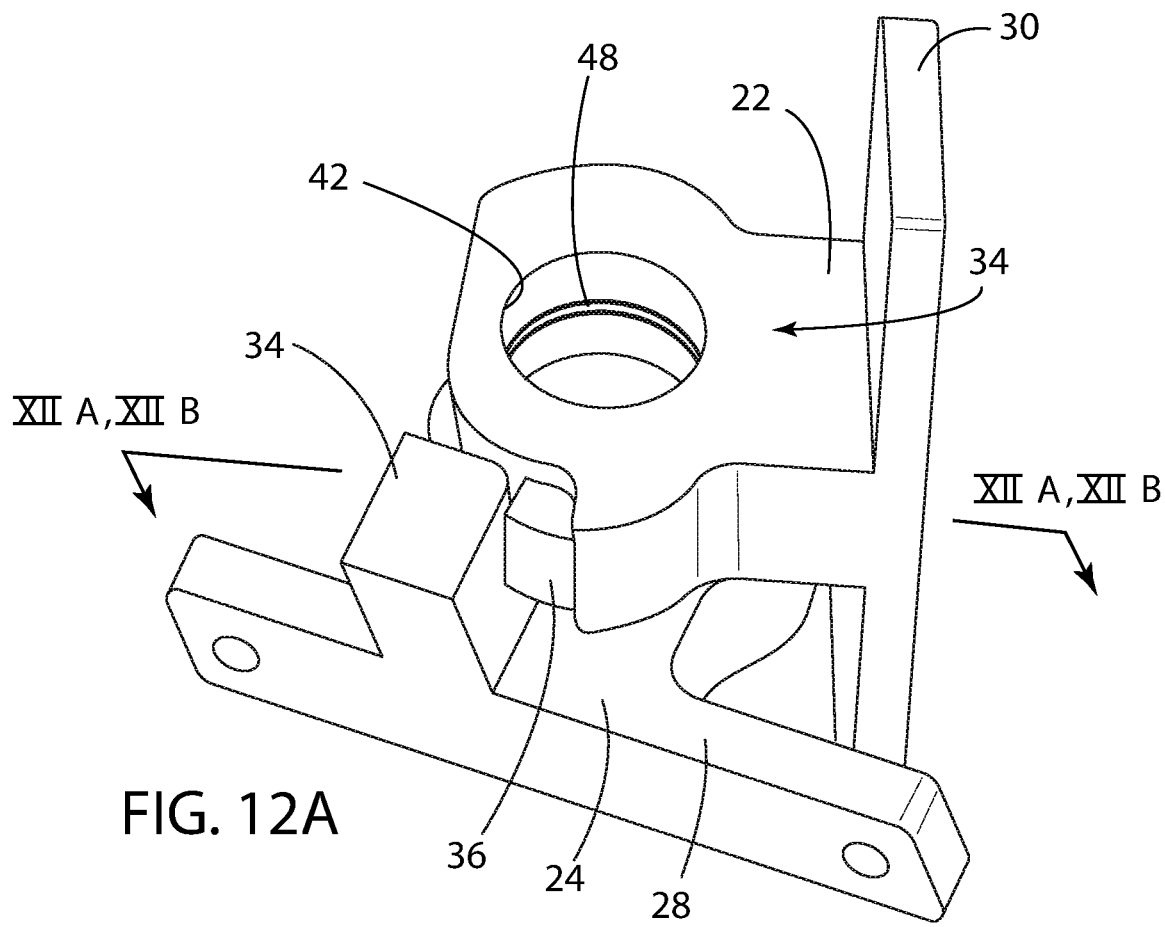
FIG. 12A
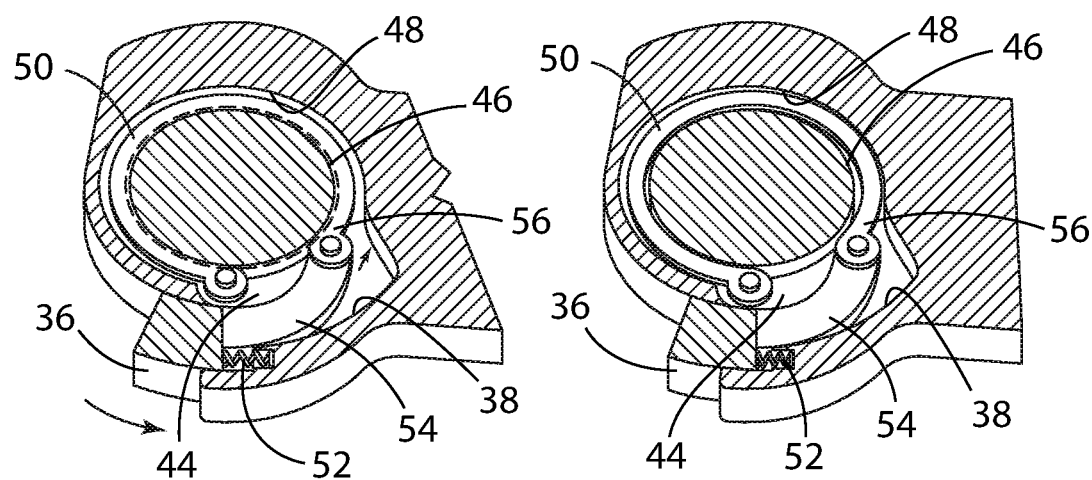
FIG. 12BFIG. 12C

SELF-CONTAINED DOOR HINGE RELEASE

FIELD OF THE DISCLOSURE

The present disclosure generally relates to a door hinge assembly for a removable motor vehicle door assembly. More specifically, the present disclosure relates to an improved release for a door hinge assembly for a removable door assembly that may be readily removed from and reattached to the motor vehicle.

BACKGROUND OF THE INVENTION

Particularly in the case of off-road sport utility vehicles, it may desirable to remove removable passenger ingress and egress doors that are designed for such operation. However, removing and reattaching removable door assemblies for motor vehicles, particularly off-road sport utility vehicles, is presently often a cumbersome and non-intuitive process that may require the operator to lift heavy items, may require tools, and may require the assistance of others. Accordingly, a door hinge assembly allowing the removal of a removable door assembly that operates intuitively without the use of tools and which may be operated by one person regardless of physical stature is desired.

SUMMARY OF THE INVENTION

According to a first aspect of the present disclosure, a door hinge assembly for a removable door assembly of a motor vehicle comprises a first hinge member mounted to the motor vehicle and a second hinge member mounted to the removable door assembly and removably mounted to the first hinge member, the removable door assembly being rotatable between a closed position and a nominal fully open position. A locking member pivotably and selectively retains the second hinge member relative the first hinge member when the removable door assembly is rotated between the closed position and the nominal fully open position. A release block is disposed on one of either the first hinge member or the second hinge member, and a release tab is disposed on the other of either the first hinge member or the second hinge member. The release tab is resiliently urged to a locked position when the removable door assembly is rotated between the closed position and the nominal fully open position. The release tab is displaced to an unlocked position by the release block when the removable door assembly is rotated to an extended open position, whereupon the first hinge member may be separated from the second hinge member.

Embodiments of the first aspect of the present disclosure can include any one or a combination of the following features:

The first hinge member comprises the release block and the second hinge member comprises the release tab.

An electrical interface is disposed between the motor vehicle and the removable door assembly.

The electrical interface comprises a female connector disposed on either of the first hinge member or the second hinge member and a male connector disposed on the other of the first hinge member or the second hinge member.

The male connector comprises short wipe male terminals.

One of the female connector or the male connector comprises a squeeze tab to allow the female connector or the male connector to be disconnected from the male connector or the female connector, respectively.

The one of the female connector or the male connector remains operably coupled with either the first hinge member or the second hinge member after the female connector is disconnected from the male connector.

A swivel is disposed on either of the female connector or the male connector allowing rotation of the removable door assembly between the closed position and the nominal fully open position.

An anti-stress locator disposed on the electrical interface.

The anti-stress locator further comprises a pair of self-centering pins and a pair of cooperating depressions at radially opposed locations.

The first hinge member is mounted to an A-pillar of the motor vehicle and the second hinge member is mounted to the removable door assembly.

The release block comprises a solid rectangular stop integrally molded with the first hinge member.

The release tab comprises a movable button received within a channel integrally molded within the second hinge member.

According to a second aspect of the present disclosure, a removable door assembly for a motor vehicle rotatable between a closed position and a nominal fully open position comprises a self-contained and self-aligning door hinge assembly. The door hinge assembly further comprises a first hinge member mounted to the motor vehicle and a second hinge member mounted to the removable door assembly and removably mounted to the first hinge member. A release block and a raised collar having an outer diameter and an outer annular groove are disposed on an outer cylindrical surface thereof disposed on the first hinge member. A socket adapted to receive the raised collar and a release tab is disposed on the second hinge member. A locking member pivotably and selectively retains the second hinge member relative the first hinge member when the removable door assembly is rotated between the closed position and the nominal fully open position, wherein the locking member comprises a C-clip operably coupled with the release tab and disposed within an inner annular groove provided within the socket, the C-clip having a first inner diameter smaller than the outer diameter of the raised collar in a first relaxed position and the C-clip having a second inner diameter larger than the outer diameter of the raised collar in a second displaced position corresponding to the removable door assembly being rotated to an extended open position. The release tab is resiliently urged to a locked position when the removable door assembly is rotated between the closed position and the nominal fully open position, whereby the C-clip remains in the first relaxed position. The release tab is urged to an unlocked position by the release block when the removable door assembly is rotated beyond the nominal fully open position to the extended open position, whereby the release tab displaces the C-clip to the second displaced position, whereupon the C-clip has the second inner diameter larger than the outer diameter of the raised collar and the first hinge member may be separated from the second hinge member.

Embodiments of the second aspect of the present disclosure can include any one or a combination of the following features:

The removable door assembly further comprises a pair of self-centering pins on either the first hinge member or the second hinge member and a pair of cooperating depressions on the other of either the first hinge member or the second hinge member, each of the pair of a self-centering pins and the pair of cooperating depressions disposed at radially opposed locations.

According to a third aspect of the present disclosure, a removable door assembly for a motor vehicle rotatable between a closed position and a nominal fully open position comprises a self-contained and self-aligning door hinge assembly. The door hinge assembly further comprises a first hinge member mounted to the motor vehicle and second hinge member mounted to the removable door assembly and removably mounted to the first hinge member. A locking member pivotably and selectively retains the second hinge member relative the first hinge member when the removable door assembly is rotated between the closed position and the nominal fully open position. A release block is disposed on one of either the first hinge member or the second hinge member. A release tab is disposed on the other of either the first hinge member or the second hinge member, wherein the release tab is resiliently urged to a locked position when the removable door assembly is rotated between the closed position and the nominal fully open position, and wherein the release tab is urged to an unlocked position by the release block when the removable door assembly is rotated to an extended open position, whereupon the first hinge member may be separated from the second hinge member. An electrical interface is disposed between the motor vehicle and the removable door assembly, the electrical interface comprising a female connector disposed on either the first hinge member or the second hinge member, a male connector disposed on the other of the first hinge member or the second hinge member, and a swivel disposed on either of the female connector or the male connector allowing rotation of the removable door assembly between the closed position and the nominal fully open position.

Embodiments of the third aspect of the present disclosure can include any one or a combination of the following features:

- One of the female connector or the male connector comprises a pair of opposed squeeze tabs to allow the one of the female connector or the male connector to be disconnected from the other, and wherein the one of the female connector or the male connector remains operably coupled with either the first hinge member or the second hinge member after disconnection of the one of the female connector or the male connector from the other.
- A protective removable cap adapted to selectively seal the female connector or the male connector disposed on the first hinge member after the first hinge member is separated from the second hinge member and the removable door assembly is removed.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a perspective view of the assembled door hinge assembly for a removable door assembly in accordance with the present disclosure;

FIG. 3 is a perspective view of the disassembled door hinge assembly for a removable door assembly in accordance with the present disclosure shown in FIG. 2;

FIG. 8 is a top view of the assembled door hinge assembly for a removable door assembly in accordance with the present disclosure shown in FIG. 2, with the removable door assembly in the closed position:

FIG. 9 is a top view of the assembled door hinge assembly for a removable door assembly in accordance with the present disclosure shown in FIG. 2, with the removable door assembly in the extended open position;

FIG. 10 is a top view of the disassembled door hinge assembly for a removable door assembly in accordance with the present disclosure taken along the line XI-XI shown in FIG. 2;

FIG. 12A is a perspective view of the assembled door hinge assembly for a removable door assembly in accordance with the present disclosure shown in FIG. 2, with the removable door assembly in the nominal fully open position and the raised collar on the first hinge omitted for clarity;

FIG. 12B is a perspective cross-sectional view of the assembled door hinge assembly for a removable door assembly in accordance with the present disclosure taken along the line XIIB-XIIB shown in FIG. 12A, with the C-clip in a first relaxed position;

FIG. 12C is a perspective cross-sectional view of the assembled door hinge assembly for a removable door assembly in accordance with the present disclosure taken along the line XIIC-XIIC shown in FIG. 12A, with the C-clip in a second displaced position;

DETAILED DESCRIPTION OF THE PREFERRED EMBODIMENTS

Figure 1A:
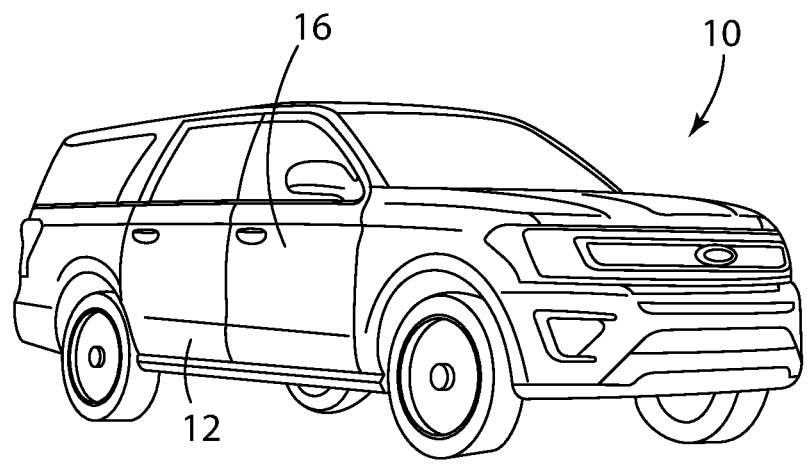
FIG. 1A is a perspective view of a motor vehicle equipped with a removable door assembly intended for removal from the motor vehicle, with the removable door assembly attached.
Figure 1B:
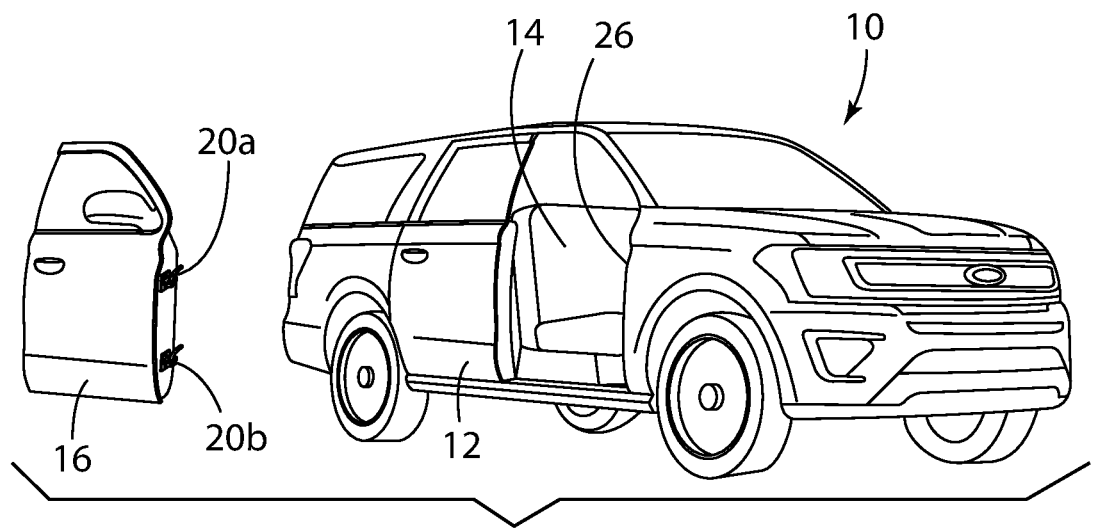
FIG. 1B is a perspective view of the motor vehicle equipped with a removable door assembly intended for removal from the motor vehicle, with the removable door assembly removed.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations related to a door hinge assembly for a removable door. Accordingly, the components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1A, reference numeral 10 generally designates a motor vehicle. It should be understood that the motor vehicle 10 may be a wheeled motor vehicle, a boat, a plane, a driver-controlled vehicle, and/or an autonomous vehicle. The motor vehicle 10 may be equipped with a body 12 defining therein an inside passenger cabin 14. The motor vehicle 10 may also be provided with passenger ingress and egress door assemblies. In the case of certain vehicles, in particular in the case of off-road sport utility vehicles, such passenger ingress and egress door assemblies 16 may be designed to be removed from the motor vehicle 10 by the operator as an alternative operational mode of the motor vehicle 10.

Figure 4:
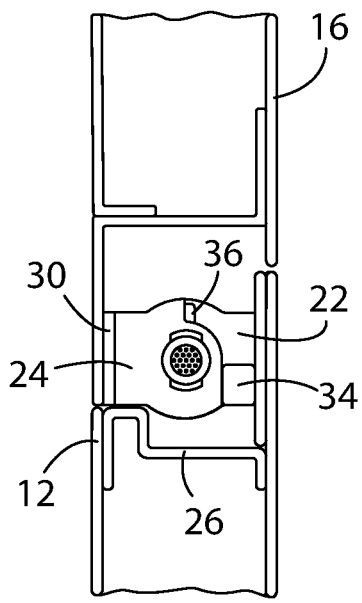
FIG. 4 is a top view of the assembled door hinge assembly for a removable door assembly in accordance with the present disclosure shown in FIG. 2, with the removable door assembly in the closed position.
Figure 5:
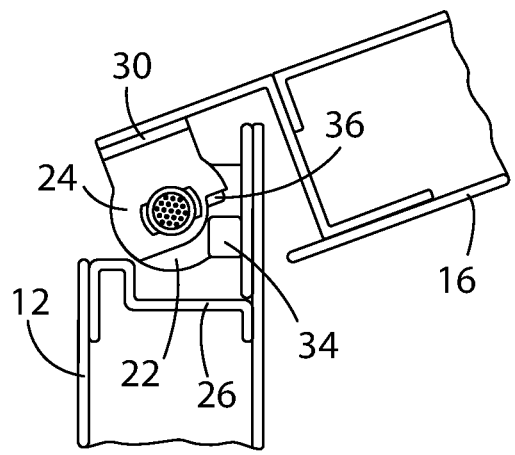
FIG. 5 is a top view of the assembled door hinge assembly for a removable door assembly in accordance with the present disclosure shown in FIG. 2, with the removable door assembly in the nominal fully open position.

To facilitate the operation of removing and reattaching the removable door assembly 16, particularly in the case of off-road sport utility vehicles, a pair of door hinge assemblies 20 arranged in vertical relation may be used to operably couple the removable door assembly 16 to the body 12. The upper door hinge assembly 20a, according to the present disclosure, may be seen in more detail in FIGS. 2 and 3, as well as many of the other Figures. The lower door hinge assembly 20b may be similar, or may omit the locking member and/or the electrical interface, each of which is further described below. First The door hinge assembly 20, in particular the upper door hinge assembly 20a, includes a first hinge member 22 mounted to the body 12 of the motor vehicle 10 and a second hinge member 24 mounted to the removable door assembly 16 and removably mounted to the first hinge member 22. When attached to the body 12 of the motor vehicle 10, the removable door assembly 16 may be rotated between a closed position and a nominal fully open position, as shown in FIGS. 4 and 5. A fluorocarbon polymer with slippery, non-stick properties may be disposed as a layer 136 between the first hinge member 22 and the second hinge member 24, as shown in FIG. 11, to prevent binding between the first hinge member 22 and the second hinge member 24 and to provide smooth operation of the removable door assembly 16 opening and closing.

The first hinge member 22 of the door hinge assembly 20 may be mounted to the A-pillar 26 of the body 12 of the motor vehicle 10 and the second hinge member 24 may be mounted to the removable door assembly 16 in the same manner as a traditional door hinge assembly might be mounted. In addition, it should be understood that the door hinge assembly 20 may be mounted to a B-pillar or a rear hatch opening (not shown) in order to removably mount a removable rear door assembly or a removable rear side swing gate, respectively. As shown in FIGS. 2 and 3, the mounting ears 28 of the first hinge member 22 operably attached to the A-pillar 26 are oriented horizontally, while the mounting ears 30 of the second hinge member 24 are oriented vertically. The removable door assembly 16 may thus have a conventional rotational travel path similar to typical door hinge assemblies, but may also have an additional travel path for when customer wants to disengage the door, as described further below.

Figure 11:
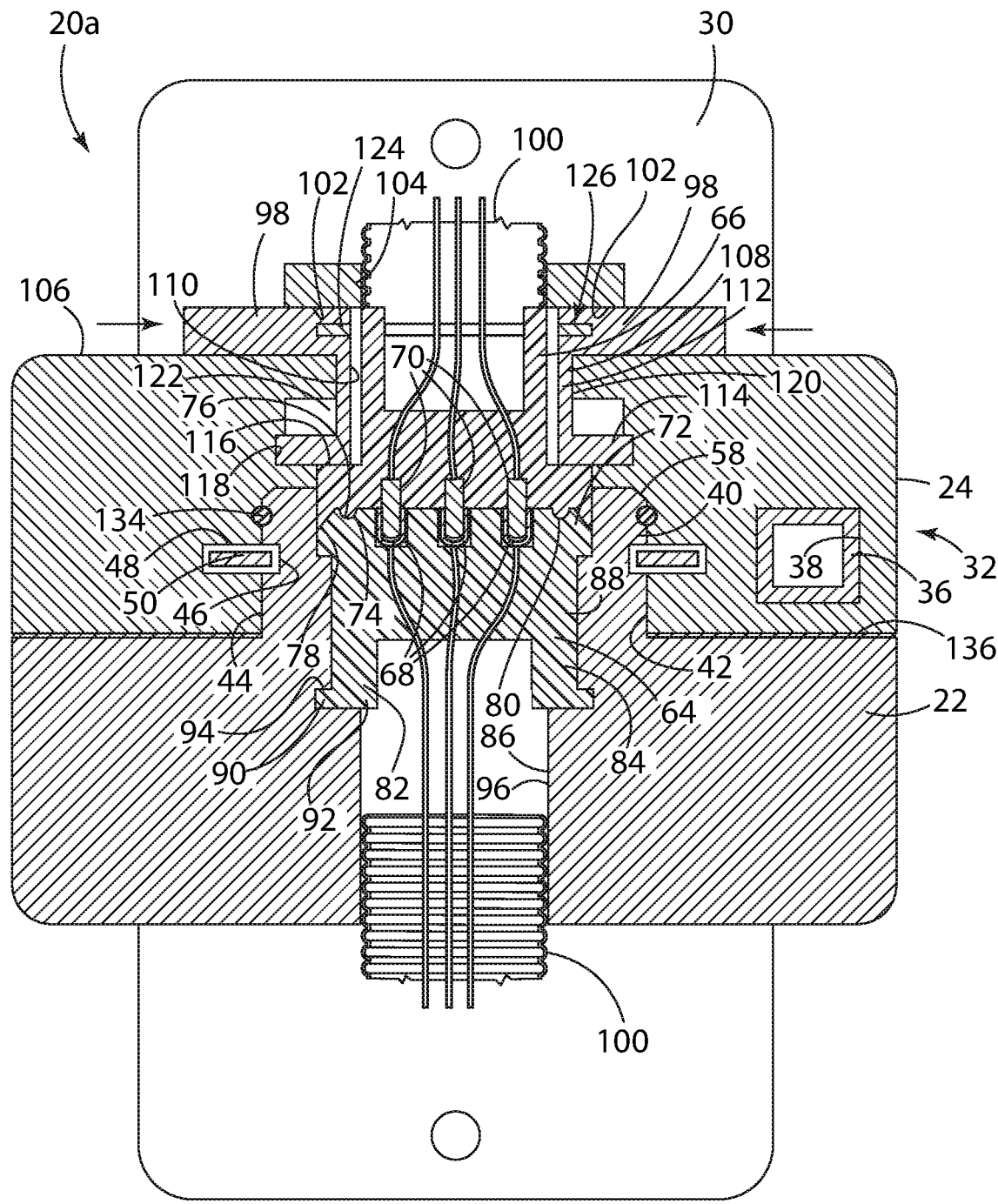
FIG. 11 is a cross-sectional view of the assembled door hinge assembly for a removable door assembly in accordance with the present disclosure shown in FIG. 2.

As shown in FIG. 11, a locking member 32 pivotably and selectively retains the second hinge member 24 relative the first hinge member 22 as the removable door assembly 16 may be rotated between the closed position and the nominal fully open position, as shown in FIGS. 4 and 5. Within this range of rotational travel, the locking member 32 is in a locked condition. When the locking member 32 is an unlocked condition, the removable door assembly 16 may be removed from the motor vehicle 10.

To actuate the locking member 32 and place the locking member 32 in the unlocked condition, the locking member 32 may comprise a release block 34 disposed on one of either the first hinge member 22 or the second hinge member 24. The locking member 32 may further comprise a release tab 36 may be disposed on the other of either the first hinge member 22 or the second hinge member 24. In the case where the first and second hinge members 22, 24 are injection molded of a polymeric material, the release block 34 may comprise a solid rectangular stop integrally molded with the first hinge member 22. Similarly, the release tab 36 may comprise a molded polymeric movable button received within a channel 38 integrally molded within the second hinge member 24, as perhaps best shown in FIGS. 11 and 12A-12C. Additionally, the first and second hinge members 22, 24 may be fabricated from other materials, such as stamped or cast metal alloys, such as steel or aluminum, or combinations of polymeric materials and metal alloys.

The release tab 36 is resiliently urged to a locked position as the removable door assembly 16 is rotated between the closed position and the nominal fully open position, as shown in FIGS. 2, 4, 5, and 8. However, when the removable door assembly 16 is rotated to an extended open position, as shown in FIG. 9, the release tab 36 engages the release block 34 and is displaced to an unlocked position by the release block 34, whereupon the locking member 32 is displaced to the unlocked condition and the first hinge member 22 may be separated from the second hinge member 24. As shown in the Figures, the release block 34 is disposed on the first hinge member 22 and the release tab 36 is disposed on the second hinge member 24. However, it should be understood that the release tab 36 may be disposed on the first hinge member 22 and the release block 34 may be disposed on the second hinge member 24.

The locking member 32 may also include a raised collar 40 disposed on the first hinge member 22 and a socket 42 disposed on the second hinge member 24. The raised collar 40 has an outer diameter about an outer cylindrical surface 44 thereof and the socket 42 has an inner diameter slighter larger than the outer diameter of the raised collar 40, thus allowing the socket 42 to rotatably receive the raised collar 40. The raised collar 40 may further be equipped with an outer annular groove 46 disposed on the outer cylindrical surface 44 thereof. As perhaps best shown in FIG. 11, the socket 42 also has an oversized inner annular groove 48 within which is loosely is received a C-clip 50, which operates as a spring, operably coupled with the release tab 36. The C-clip 50, in a first relaxed position, as shown in FIG. 11, has a first inner diameter smaller than the outer diameter of the raised collar 40, such that the first inner diameter of the C-clip 50 is received within the outer annular groove 46 of the raised collar 40. As the first inner diameter of the C-clip 50 extends into both the inner annular groove 48 of the socket 42 and the outer annular groove 46 of the raised collar 40 in the first relaxed position, the raised collar 40 may be prevented from being withdrawn from the socket 42. The locking member 32 thus pivotably and selectively retains the second hinge member 24 relative the first hinge member 22 as the removable door assembly 16 is rotated between the closed position and the nominal fully open position, As noted above, the C-clip 50 is operably coupled with the release tab 36, whereby when the removable door assembly 16 is rotated to the extended open position, shown in FIG. 9, the release tab 36 engages the release block 34. A resilient member 52, such as a compression spring, which resiliently urges the release tab 36 to a locked position when the removable door assembly 16 is rotated between the closed position and the nominal fully open position, is compressed by displacement of the release tab 36 when the removable door assembly 16 is rotated to the extended open position as the release tab 36 engages the release block 34. A distal end 54 of the release tab 36 then engages a first leg 56 of the C-clip 50, which expands the C-clip 50, whereby the raised collar 40 may be withdrawn from the socket 42.

That is, the C-clip 50 is displaced within the oversized inner annular groove 48 of the socket 42 by the release tab 36 and C-clip 50 is fully expanded upon full rotation of the removable door assembly to the extended open position, such that a second inner diameter of the C-clip 50 is larger than the outer diameter of the raised collar 40 in a second displaced position, as shown in FIGS. 12A-12C. The sectioned portion of FIGS. 12B-12C shows the hidden portion of the release tab 36 that moves within the channel 38 of the second hinge member 24 to engage the first leg 56 of the C-clip 50. As the second inner diameter of the C-clip 50 no longer extends into the outer annular groove 46 of the raised collar 40 in the second displaced position, the operator may lift and remove the removable door assembly 16.

Accordingly, the release tab 36 may be resiliently urged to a locked position by the resilient member 52 as the removable door assembly 16 is rotated between the closed position and the nominal fully open position, whereby the C-clip 50 remains in the first relaxed position. However, the release tab 36 is urged to an unlocked position by the release block 34 when the removable door assembly 16 is rotated beyond the nominal fully open position (as shown in FIG. 9) to an extended open position, whereby the release tab 36 displaces the C-clip 50 to the second displaced position and the first hinge member 22 may be separated from the second hinge member 24 when the door hinge assembly 20 goes beyond a nominal fully open angle of less than 90°, and to a "door off" angle at or exceeding 90°, wherein the C-clip 50 opens and allows removable door assembly 16 to be removed.

Reattachment of the removable door assembly is facilitated by a chamfered upper outer edge 58 of the raised collar 40, as perhaps best shown in FIG. 11. As the socket 42 on the second hinge member 24 of the removable door assembly 16 is lowered onto the raised collar 40 of the first hinge member 22, the chamfered upper outer edge 58 of the raised collar 40 engages the C-clip 50, which is in the first relaxed position. As the socket 42 on the second hinge member 24 of the removable door assembly 16 is further lowered onto the raised collar 40 of the first hinge member 22, the C-clip 50 is expanded by the chamfered upper outer edge 58 of the raised collar 40 until its inner diameter exceeds the outer diameter of the raised collar 40 and the C-clip 50 is thus displaced to the second displaced position, allowing the socket 42 on the second hinge member 24 of the removable door assembly 16 to be further lowered onto the raised collar 40 of the first hinge member 22. Finally, as the socket 42 on the second hinge member 24 of the removable door assembly 16 is even further lowered onto the raised collar 40 of the first hinge member 22, the inner diameter of the C-clip 50 encounters the outer annular groove 46 of the raised collar 40 and returns to its first relaxed position, whereupon the C-clip 50 again extends into both the inner annular groove 48 of the socket 42 and the outer annular groove 46 of the raised collar 40 in the first relaxed position and prevents the raised collar 40 from being withdrawn from the socket 42.

In addition, as shown if FIGS. 8-10, a door check 60 may be functionally incorporated into the door hinge assembly 20 itself. That is, a door check function may be provided by using the resilient member 52 operably coupled with the release tab 36 on the second hinge member 24 to provide a door check 60.

An additional feature of the door hinge assembly 20 of the present disclosure is a detachable electrical interface 62 disposed between the motor vehicle 10 and the removable door assembly 16. Such an electrical interface 62 may be desired to provide electrical power and functionality for several motor vehicle components and assemblies (not shown), including, but not limited to, such components and assemblies as an electrical mirror adjustment control, mirror defroster, door-mounted and mirror-mounted sensors and cameras, automatic mirror dimming control, mirror-mounted lighting, speakers, power windows, and power door locks.

Figure 6:
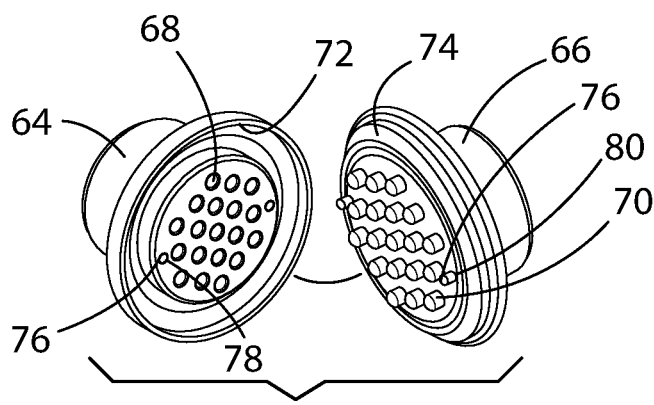
FIG. 6 is a perspective view of the disassembled female and male connector for the door hinge assembly for a removable door assembly in accordance with the present disclosure shown in FIG. 2.
Figure 7:
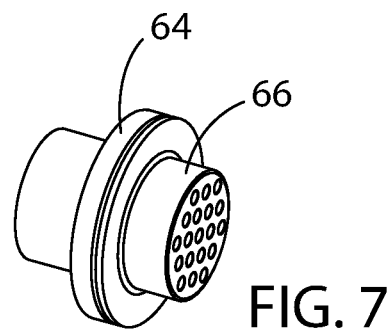
FIG. 7 is a perspective view of the assembled female and male connector for the door hinge assembly for a removable door assembly in accordance with the present disclosure shown in FIG. 2.

The electrical interface 62 may include a female connector 64 disposed on either first or second hinge member 22, 24 and a male connector 66 disposed on the other of the first or second hinge member 22, 24, as shown in FIGS. 6 and 7. The female connector 64 is provided with shallow female terminals 68 that receive relatively robust short wipe male terminals 70 on the male connector 66. The female connector 64 may also include an annular cavity 72 that receives an annular collar 74 on the male connector 66 that provides over-stress protection for the female and male terminals 68, 70. In addition, the electrical interface 62 may have an additional anti-stress locator 76 that further act to self-center the door hinge assembly 20 and the female and male connector 64, 66 of the electrical interface 62 during reassembly. The anti-stress locator 76 may include a pair of self-centering pins 78 on either the first hinge member 22 or the second hinge member 24 and a pair of cooperating depressions 80 on the other of either the first hinge member 22 or the second hinge member 24, each of the pair of self-centering pins 78 and the pair of cooperating depressions 80 disposed at radially opposed locations, as shown in FIGS. 6 and 11. The self-centering pins 78 and depressions 80 may be keyed to prevent the electrical interface 62 from being assembled incorrectly. This feature may also add robustness to the electrical interface 62 by providing supporting structure, rather than that provided by the male terminals 70 themselves, to react the electrical interface 62 rotation friction forces generated during operation and rotation of the removable door assembly 16 between the closed position and the nominal fully open position.

The electrical interface 62 may also include a swivel 82. As shown in FIG. 11, a cross-section of the upper door hinge assembly 20a is shown, where the female connector 64, within which the females terminals 68 are mounted, includes a first cylindrical body 84 rotatably disposed within a first central cylindrical cavity 86 within the first hinge member 22. The first cylindrical body 84 further includes a first skirt 88 and an outwardly and radially extending lip 90 mounted at a lower edge 92 thereof. An inner annular groove 94 on the inner surface 96 of the first central cylindrical cavity 86 within the first hinge member 22 receives the outwardly and radially extending lip 90, such that the first cylindrical body 84 may freely rotate within the first central cylindrical cavity 86 within the first hinge member 22, but is restrained from axial movement within the first central cylindrical cavity 86 within the first hinge member 22, providing rotational freedom within which the electrical interface 62 can rotate. This swivel function is provided to prevent the electrical pins of the male terminals 70 from being twisted relative the female terminals 68 when the removable door assembly 16 is opened and closed and thereby release the female and male terminals 68, 70 from mechanical stress in cooperation with the anti-stress locator 76 discussed above. However, it should be understood that a swivel interface is not 100% free from friction. Also, although shown on the first hinge member 22, the swivel 82 may be disposed on either female or male connector 64, 66, allowing rotation of the removable door assembly 16 between the closed position and the nominal fully open position.

In addition, one of the female connector 64 or the male connector 66 may comprise a squeeze tab 98 to allow disconnection of the female connector 64 from the male connector 66, and wherein the one of the female connector 64 or the male connector 66 remains operably coupled with either the first or second hinge member 22, 24 after disconnection of the female connector 64 from the male connector 66. As shown in FIGS. 2 and 3, a wiring harness 100 is incorporated through the upper second hinge member 24. Although also shown with a wiring harness 100, the lower first hinge member 22 may not require a wiring harness 100, but only the release block 34 and the integrated door check 60.

For example, a pair of opposed squeeze tabs 98 may be located on opposed sides of the male connector 66, as shown in FIGS. 2, 3, and 11, and slidably received within slots 102 provided on a cylindrical boss 104 disposed on an upper surface 106 of the second hinge member 24. The male connector 66, within which the males terminals 70 are mounted, also includes a second cylindrical body 108 that is disposed within a second central cylindrical cavity 110 within the second hinge member 24. The second cylindrical body 108 further includes a second skirt 112 and an outwardly and radially extending lip 114 mounted at a lower edge 116 thereof. An inner annular groove 118 on the inner surface 120 of the second central cylindrical cavity 110 within the second hinge member 24 receives the outwardly and radially extending lip 114 of the second cylindrical body 108, such that the second cylindrical body 108 is restrained from axial movement within the second central cylindrical cavity 110 within the second hinge member 24. A shoulder portion 122 is provided in the second central cylindrical cavity 110 proximate the inner annular groove 118 on the inner surface 120 of the second central cylindrical cavity 110, the shoulder portion 122 having a smaller outer diameter than that of the inner annular groove 118 on the inner surface 120 of the second central cylindrical cavity 110. A C-clip 124 may be disposed between the pair of opposed squeeze tabs 98 and within an inner annular groove 126 of the cylindrical boss 104 disposed on the upper surface 106 of the second hinge member 24 to urge the pair of opposed squeeze tabs 98 away from each other.

When finger pressure is applied to the pair of opposed squeeze tabs 98, they are each displaced radially inwardly within the slots 102, thus displacing the outwardly and radially extending lip 114 on the second cylindrical body 108 radially inward and allowing the male connector 66 to be axially withdrawn a slight distance and into the shoulder portion 122 of the second central cylindrical cavity 110 within the second hinge member 24 and out of engagement with the female connector 64, thus disconnecting the electrical interface 62. There may be therefore exist a small amount of free play within the electrical interface 62, allowing the male connector 66 to move up and down slightly, but both the female and male connectors 64, 66 remain attached to the first and second hinge members 22, 24, respectively.

Figure 13:
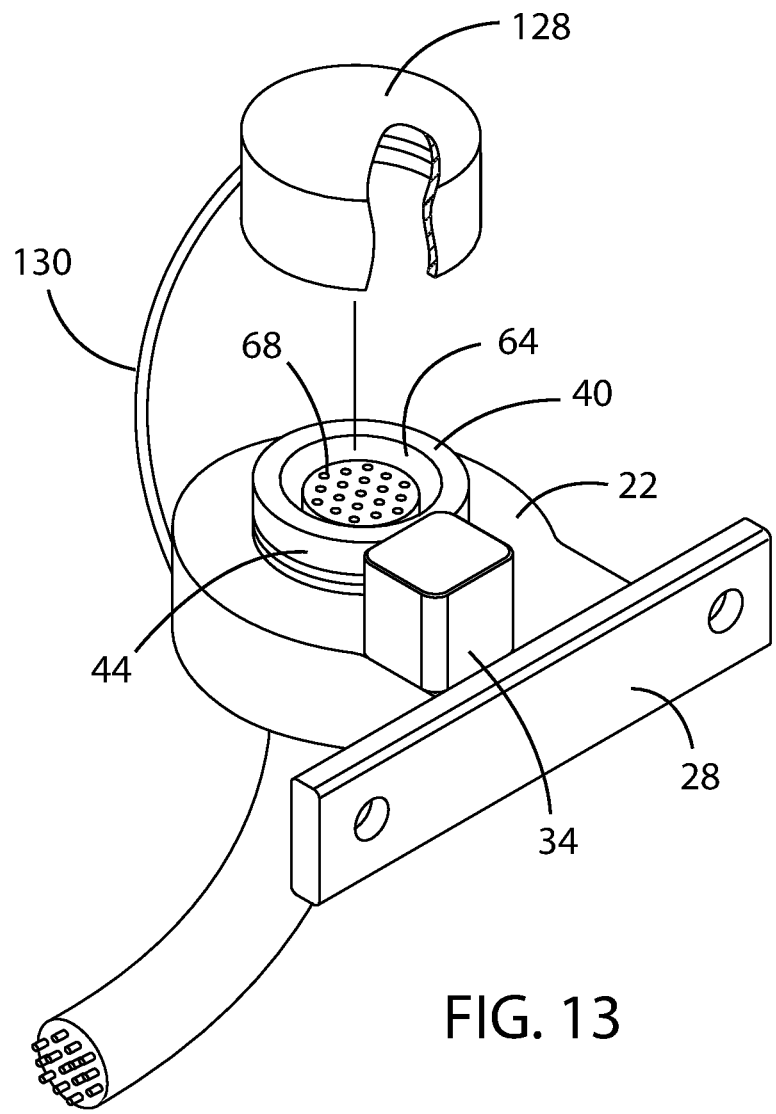
FIG. 13 is a perspective view of the first hinge member of the door hinge assembly for a removable door assembly in accordance with the present disclosure shown in FIG. 2, and a protective removable cap adapted to mount on the raised collar thereof.

As a further feature of the present door hinge assembly 20, when the removable door assembly 16 is removed, the female connector 64 may be exposed and protection form debris may be needed. A protective removable cap 128, as shown in FIG. 13, may be attached to the first hinge member 22 via a dongle 130 and used to seal off the female or male connector 64, 66 on the first hinge member 22 after the first hinge member 22 is separated from the second hinge member 24 and the removable door assembly 16 is removed. The protective removable cap 128 may be fabricated of an elastomeric material, such as rubber, to provide a snug, watertight fit. In addition, an O-ring 134 may be provided between the outer cylindrical surface 44 of the raised collar 40 and the socket 42 to provide protection when the door hinge assembly 20 is assembled.

Figure 14:
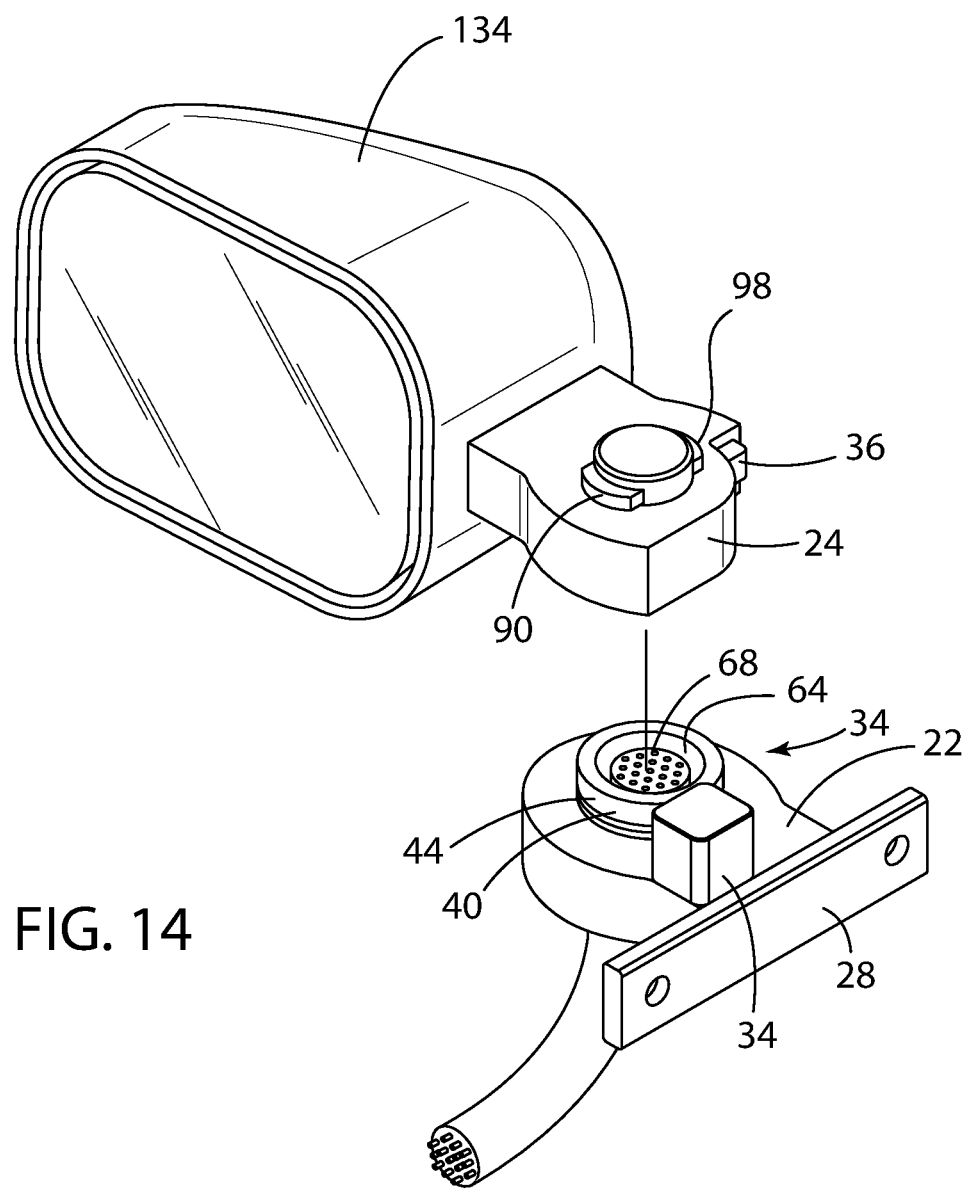
FIG. 14 is a perspective view of the first hinge member of the door hinge assembly for a removable door assembly in accordance with the present disclosure shown in FIG. 2, and an exterior door mirror assembly adapted to mount thereon.

An additional feature of the present door hinge assembly 20 is that an exterior door mirror assembly 134 can be provided with a similar hinge assembly 20 and may be detached from the removable door assembly 16, after removal of the removable door assembly 16, and attached to the first hinge member 22 via a second hinge member 24 fixedly attached to the exterior door mirror assembly 134, as shown in FIG. 14. Thus, using a hinge assembly 20 having a first hinge member 22, the exterior door mirror assembly 134 can be removed from a similarly designed first hinge member 22 serving as a pedestal post on the removable door assembly 16 and subsequently affixed to the first hinge member 22 of the upper door hinge assembly 20a with the same mechanical connection and electrical interface 62 features as described above, thus providing a fully functional exterior door mirror assembly 134 for the motor vehicle.

The door hinge assembly 20 disclosed herein thus provides a self-contained door hinge release is a new modular type of door hinge assembly 20 that enables relatively easy removal and reattachment of removable door assemblies 16 on motor vehicles 10. It provides mechanical support, an electrical interface 62 and a controlled rotational travel path. If the removable door assembly 16 is fully opened and over-extended by the operator, the C-clip 50 releases the first hinge member 22 from the second hinge member 24, and the operator can simply lift up on the removable door assembly 16 and remove it. Likewise, for reattachment of the removable door assembly 16 to the motor vehicle 10, the second hinge member 24 on the removable door assembly 16 is simply positioned above and aligned with the first hinge member 22 and the self-centering attachment features aligning the terminal pins of the electrical interface 62 and the first and second hinge members 22, 24 are snapping together. No tools are required. The electrical interface 62 uses a simple, intuitive squeeze tab 98 that may be squeezed to partially remove the male terminals 70 of the male connector 66 on the upper second hinge member 24 from the female terminals 68 of the female connector 64 on the lower first hinge member 22, while maintaining alignment of both within the door hinge assembly 20.

The advantages of the aforementioned door hinge assembly 20 for a removable door assembly 16 of a motor vehicle 10 include faster removal and reattachment, no tools required, and electric and mechanical interfaces that are all self-contained in one assembly. In addition, it is contemplated that the disclosed door hinge assembly 20 can be sold as an after-market accessory, as well as provided as an OEM feature, and may be designed to fit in existing door hinge assembly fittings and marketed for a wide number of motor vehicle make and model applications, as the mounting surface shape may be readily changed to fit various package spaces.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A door hinge assembly for a removable door assembly of a motor vehicle, the door hinge assembly comprising:
    a first hinge member mounted to the motor vehicle;
    a second hinge member mounted to the removable door assembly and removably mounted to the first hinge member, the removable door assembly being rotatable between a closed position and a nominal fully open position;
    a locking member pivotably and selectively retaining the second hinge member relative the first hinge member when the removable door assembly is rotated between the closed position and the nominal fully open position;
    a release block disposed on one of either the first hinge member or the second hinge member; and
    a release tab disposed on the other of either the first hinge member or the second hinge member, wherein the release tab is resiliently urged to a locked position when the removable door assembly is rotated between the closed position and the nominal fully open position, and wherein the release tab is displaced to an unlocked position by the release block when the removable door assembly is rotated to an extended open position, whereupon the first hinge member may be separated from the second hinge member.

2. The door hinge assembly of claim 1, wherein the first hinge member has a raised collar and the second hinge member has a socket that receives the raised collar.

3. The door hinge assembly of claim 2, wherein:
the raised collar has an outer diameter and an outer annular groove disposed on an outer cylindrical surface thereof; and
the socket has an inner annular groove;
wherein the locking member comprises a C-clip mounted within the inner annular groove and operably coupled with the release tab, the C-clip having a first inner diameter smaller than the outer diameter of the raised collar in a first relaxed position and the C-clip having a second inner diameter larger than the outer diameter of the raised collar in a second displaced position corresponding to the removable door assembly being rotated to the extended open position.

4. The door hinge assembly of claim 3, wherein the first hinge member comprises the release block and the second hinge member comprises the release tab.

5. The door hinge assembly of claim 1, further comprising an electrical interface disposed between the motor vehicle and the removable door assembly.

6. The door hinge assembly of claim 5, wherein the electrical interface comprises:
a female connector disposed on either of the first hinge member or the second hinge member; and
a male connector disposed on the other of the first hinge member or the second hinge member.

7. The door hinge assembly of claim 6, wherein the male connector comprises short wipe male terminals.

8. The door hinge assembly of claim 6, wherein one of the female connector or the male connector comprises a squeeze tab to allow the female connector or the male connector to be disconnected from the male connector or the female connector, respectively.

9. The door hinge assembly of claim 8, wherein the one of the female connector or the male connector remains operably coupled with either the first hinge member or the second hinge member after the female connector is disconnected from the male connector.

10. The door hinge assembly of claim 6, further comprising a swivel disposed on either of the female connector or the male connector allowing rotation of the removable door assembly between the closed position and the nominal fully open position.

11. The door hinge assembly of claim 6, further comprising an anti-stress locator disposed on the electrical interface.

12. The door hinge assembly of claim 11, wherein the anti-stress locator further comprises a pair of self-centering pins and a pair of cooperating depressions at radially opposed locations.

13. The door hinge assembly of claim 1, wherein the first hinge member is mounted to an A-pillar of the motor vehicle and the second hinge member is mounted to the removable door assembly.

14. The door hinge assembly of claim 1, wherein the release block comprises a solid rectangular stop integrally molded with the first hinge member.

15. The door hinge assembly of claim 14, wherein the release tab comprises a movable button received within a channel integrally molded within the second hinge member.

16. A removable door assembly for a motor vehicle rotatable between a closed position and a nominal fully open position comprising a self-contained and self-aligning door hinge assembly, the door hinge assembly further comprising:
a first hinge member mounted to the motor vehicle;
a second hinge member mounted to the removable door assembly and removably mounted to the first hinge member;
a release block and a raised collar having an outer diameter and an outer annular groove disposed on an outer cylindrical surface thereof disposed on the first hinge member;
a socket adapted to receive the raised collar and a release tab disposed on the second hinge member; and
a locking member pivotably and selectively retaining the second hinge member relative the first hinge member when the removable door assembly is rotated between the closed position and the nominal fully open position, wherein the locking member comprises a C-clip operably coupled with the release tab and disposed within an inner annular groove provided within the socket, the C-clip having a first inner diameter smaller than the outer diameter of the raised collar in a first relaxed position and the C-clip having a second inner diameter larger than the outer diameter of the raised collar in a second displaced position corresponding to the removable door assembly being rotated to an extended open position;
wherein the release tab is resiliently urged to a locked position when the removable door assembly is rotated between the closed position and the nominal fully open position, whereby the C-clip remains in the first relaxed position, and wherein the release tab is urged to an unlocked position by the release block when the removable door assembly is rotated beyond the nominal fully open position to the extended open position, whereby the release tab displaces the C-clip to the second displaced position, whereupon the C-clip has the second inner diameter larger than the outer diameter of the raised collar and the first hinge member may be separated from the second hinge member.

17. The removable door assembly of claim 16, further comprising a pair of self-centering pins on either the first hinge member or the second hinge member and a pair of cooperating depressions on the other of either the first hinge member or the second hinge member, each of the pair of a self-centering pins and the pair of cooperating depressions disposed at radially opposed locations.

18. A removable door assembly for a motor vehicle rotatable between a closed position and a nominal fully open position comprising a self-contained and self-aligning door hinge assembly, the door hinge assembly further comprising:
a first hinge member mounted to the motor vehicle;
a second hinge member mounted to the removable door assembly and removably mounted to the first hinge member;
a locking member pivotably and selectively retaining the second hinge member relative the first hinge member when the removable door assembly is rotated between the closed position and the nominal fully open position;
a release block disposed on one of either the first hinge member or the second hinge member;
a release tab disposed on the other of either the first hinge member or the second hinge member, wherein the release tab is resiliently urged to a locked position when the removable door assembly is rotated between the closed position and the nominal fully open position, and wherein the release tab is urged to an unlocked position by the release block when the removable door assembly is rotated to an extended open position, whereupon the first hinge member may be separated from the second hinge member; and an electrical interface disposed between the motor vehicle and the removable door assembly, the electrical interface comprising a female connector disposed on either the first hinge member or the second hinge member, a male connector disposed on the other of the first hinge member or the second hinge member, and a swivel disposed on either of the female connector or the male connector allowing rotation of the removable door assembly between the closed position and the nominal fully open position.

19. The removable door assembly of claim 18, wherein one of the female connector or the male connector comprises a pair of opposed squeeze tabs to allow the one of the female connector or the male connector to be disconnected from the other, and wherein the one of the female connector or the male connector remains operably coupled with either the first hinge member or the second hinge member after disconnection of the one of the female connector or the male connector from the other.

20. The removable door assembly of claim 19, further comprising a protective removable cap adapted to selectively seal the female connector or the male connector disposed on the first hinge member after the first hinge member is separated from the second hinge member and the removable door assembly is removed.

\* \* \* \* \*